United States Patent
Stram et al.

(10) Patent No.: US 11,127,035 B2
(45) Date of Patent: Sep. 21, 2021

(54) AGGREGATED COST PER ACTION PREDICTION

(71) Applicant: Oath Inc., New York, NY (US)

(72) Inventors: Rotem Stram, Haifa (IL); Yohay Kaplan, Haifa (IL); Michal Aharon, Haifa (IL)

(73) Assignee: Verizon Media Inc., New York, NY (US)

( * ) Notice: Subject to any disclaimer, the term of this patent is extended or adjusted under 35 U.S.C. 154(b) by 12 days.

(21) Appl. No.: 16/526,157

(22) Filed: Jul. 30, 2019

(65) Prior Publication Data
US 2021/0035157 A1 Feb. 4, 2021

(51) Int. Cl.
  *G06Q 30/02* (2012.01)
(52) U.S. Cl.
  CPC ..... *G06Q 30/0247* (2013.01); *G06Q 30/0201* (2013.01); *G06Q 30/0246* (2013.01); *G06Q 30/0249* (2013.01)
(58) Field of Classification Search
  CPC ..................................................... G06Q 30/02
  See application file for complete search history.

(56) References Cited

U.S. PATENT DOCUMENTS 8,577,726 B1 * 11/2013 Betz ................... G06Q 30/0244
                                                     705/14.69
9,767,489 B1 * 9/2017 Liu ..................... G06Q 30/0241
2013/0091011 A1 * 4/2013 Young, III ......... G06Q 30/0275
                                                     705/14.45
2018/0012264 A1 * 1/2018 Yates ................. G06Q 30/0275

FOREIGN PATENT DOCUMENTS

WO   WO 2012/012342 A2 *  1/2012   ............. G06Q 30/02

OTHER PUBLICATIONS

Feras Al-Hawari; Hadi Etaiwi; Sahel Alouneh, A Cost Effective Information Display System Based on Open Source Technologies (English), 2017 International Conference on New Trends in Computing Sciences (ICTCS)(pp. 277-282), Oct. 1, 2017 (Year: 2017).*
Alfonso Eduardo Marquez-Chamorro; Manuel Resins; Antonio Ruiz-Cortes, Predictive Monitoring of Business Process: A Survey (English), IEEE Transactions on Services Computing vol. 11, Issue: 6, pp. 962-977), Nov. 1, 2017 (Year: 2017).*

(Continued)

*Primary Examiner* — Marilyn G Macasiano
(74) *Attorney, Agent, or Firm* — Cooper Legal Group LLC

(57) ABSTRACT

One or more computing devices, systems, and/or methods for aggregated cost per action prediction are provided. Cost and conversion count data, comprising costs for a set of content items to be displayed to users and a count of conversions corresponding to actions performed by users in response to being provided with the set of content items, is tracked. The cost and conversion count data is inputted into a set of decay calculators that utilize different decay strategies. Cost per action predictions by the set of decay calculators for a content item are weighted to create an aggregated cost per action prediction, wherein the weights are based upon whether decay calculators correctly or incorrectly predicted cost per actions for the set of content items.

20 Claims, 5 Drawing Sheets

(56) References Cited

OTHER PUBLICATIONS

M. Gorgoglione; C. Palmisano; S. Lombardi, Using Contextual Information to Decrease the Cost of Incorrect Predictions in On-line Customer Behavior Modeling (English), 2008IEEE International Conference on Data Mining Workshops (pp. 780-788), Mar. 9, 2009 (Year: 2009).*

Miralles, Luis; Qureshi, M. Atif; Mac Namee, Brian, Real-time Bidding campaigns optimization using attribute selection (English), Oct. 29, 2019 (Year: 2019).*

* cited by examiner

AGGREGATED COST PER ACTION PREDICTION

BACKGROUND

Many providers, such as applications, services, and websites, provide users with access to content. In one example, a user may access emails through a mobile email application executing on a mobile device of the user. In another example, the user may navigate to a news website in order to view sports news information. In this way, users may access content from content providers that are displayed through user interfaces, such as applications and web browsers.

A provider may allow content items from other entities to be displayed through a user interface or webpage of the provider. For example, the news website may allow other companies to display content items relating to products, events, articles, recommendations, or other information that may be relevant to a user that is visiting the news website. The content items may comprise images, videos, text, audio, links, or other types of content. Because there may be millions of different content items from various entities that could be displayed, a content serving platform may be used to determine which content items to display to particular users.

Entities may pay to have content items shown to users, such as payment for when a user views a content item, clicks a content item, or converts on a content item (a conversion is any action performed after clicking the content item, such as purchasing an item or service from a landing page linked to by a content item, subscribing to a service, etc.). Content item budgets may be set for content items, and are spent as users interact with content items shown to those users. The content serving platform may utilize various content serving algorithms and models to determine which content items to show to users. For example, each content item is ranked based upon a bid value and a predicted likelihood of a particular user interacting in a particular way with the content item. In this way, the highest ranked content item is shown to that particular user.

Many entities may want to optimize bidding in a manner that increases conversions, such as bidding in a manner that results in a higher probability that a user performs a desired action after viewing a content item, such as purchasing a service or item. Unfortunately, it is difficult to predict a cost per action for bidding because the prediction of actions (conversions) is imprecise due to various factors, such as conversions being sparse events, a delay between users viewing a content item and a conversion occurring (e.g., the user may view a content item about a bike, but may order the bike a week later), frequent content item campaign changes, content item setting changes that invalidate past data, content item updates, updated bids or bidding strategies, limited budgets, target audience changes, and/or other factors.

SUMMARY

In accordance with the present disclosure, one or more computing devices and/or methods for aggregated cost per action prediction are provided. For example, entities may bid through a content serving platform on opportunities to show content items to users. Cost and conversion count data for sets of content items may be tracked, such as for a first set of content items (e.g., one or more content items associated with a campaign of an entity). The cost and conversion count data may comprise costs paid by the entity to display content items, or the cost-per-click, of the first set of content items to users (e.g., the cost of a winning bid to display a content item of the first set of content items to a user). The cost and conversion count data may comprise a count of conversions that occurred in response to the users being provided with the content items of the first set of content items. A conversion may correspond to a particular action by a user occurring after the user has viewed and clicked on a content item, such as the user purchasing a product, signing up for a service, attending an event, or any other action occurring in response to the user viewing the content item. In this way, historic and current cost and conversion count data for sets of content items may be tracked for the purpose of predicting cost per actions corresponding to the cost an entity should pay when bidding on an opportunity to display a content item to a user in a manner that has a relatively higher probability of resulting in a conversion, such as the user performing a particular action.

A cost per action aggregator may utilize a set of decay calculators for generating an aggregated cost per action prediction for content items within the first set of content items. Each decay calculator may utilize different decay strategies, half-lives, and/or decay intervals. The cost and conversion count data may be input into each decay calculator. Each decay calculator will provide its own output corresponding to a cost per action prediction or an indication that no prediction could be made. Each cost per action predicted by each decay calculator will be given a particular weight that is based upon how accurate the decay calculator previously was in correctly predicting cost per actions for content items within the first set of content items. For example, a larger weight may be given to a first cost per action prediction by a first decay calculator based upon previous cost per action predictions by the first decay calculator being more similar to actual cost per actions that occurred. Thus, the first cost per action prediction by the first decay calculator may be given more weight/consideration than cost per action predictions by less accurate decay calculators. Similarly, a smaller weight may be given to a second cost per action prediction by a second decay calculator based upon previous cost per action predictions by the second decay calculator being less similar to actual cost per actions that occurred. Thus, the second cost per action prediction by the second decay calculator may be given less weight/consideration than cost per action predictions by more accurate decay calculators.

In this way, the weighted cost per action predictions are aggregated by the cost per action aggregator to generate the aggregated cost per action prediction corresponding a cost an entity should pay when bidding on an opportunity to display the content item from the first set of content items to a user in a manner that has a relatively higher probability of resulting in a conversion, such as the user performing a particular action. Also, anomaly detection is provided in order to further decay cost and conversion count data of a set of content items that was used to create cost per action predictions that deviated from actual cost per actions beyond a threshold amount, such as due to the cost and conversion count data become irrelevant, stale, invalid, etc. due to abrupt changes in behavior of the set of content items. Further decaying the cost and conversion count data using an enhanced decay factor will result in the cost and conversion data being given less weight/significance. Furthermore, the aggregated cost per action prediction can be used for immediate and future cost per action estimation, performance monitoring, logging, optimized bidding in order to increase the probability for conversions, etc.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
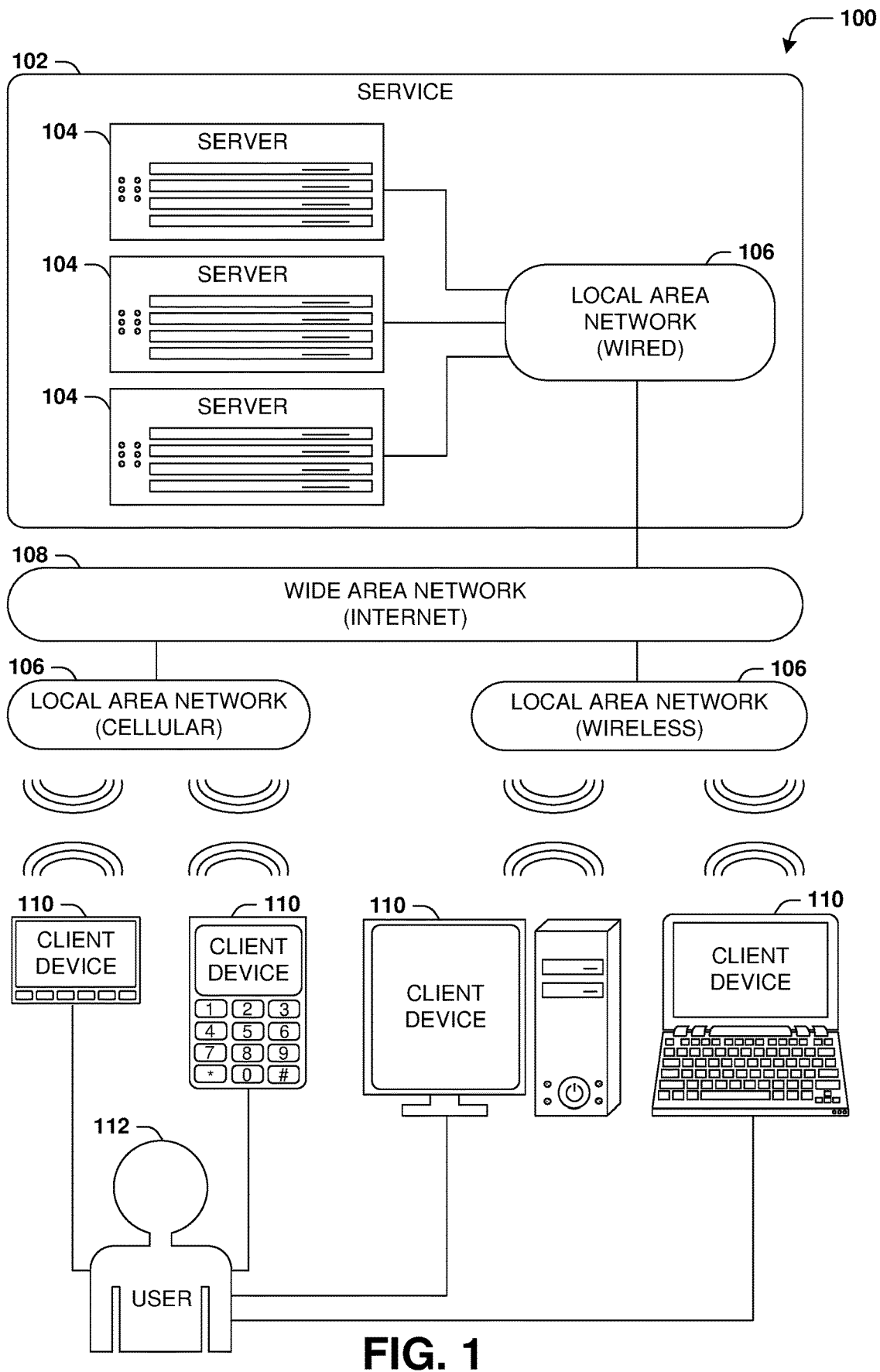
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
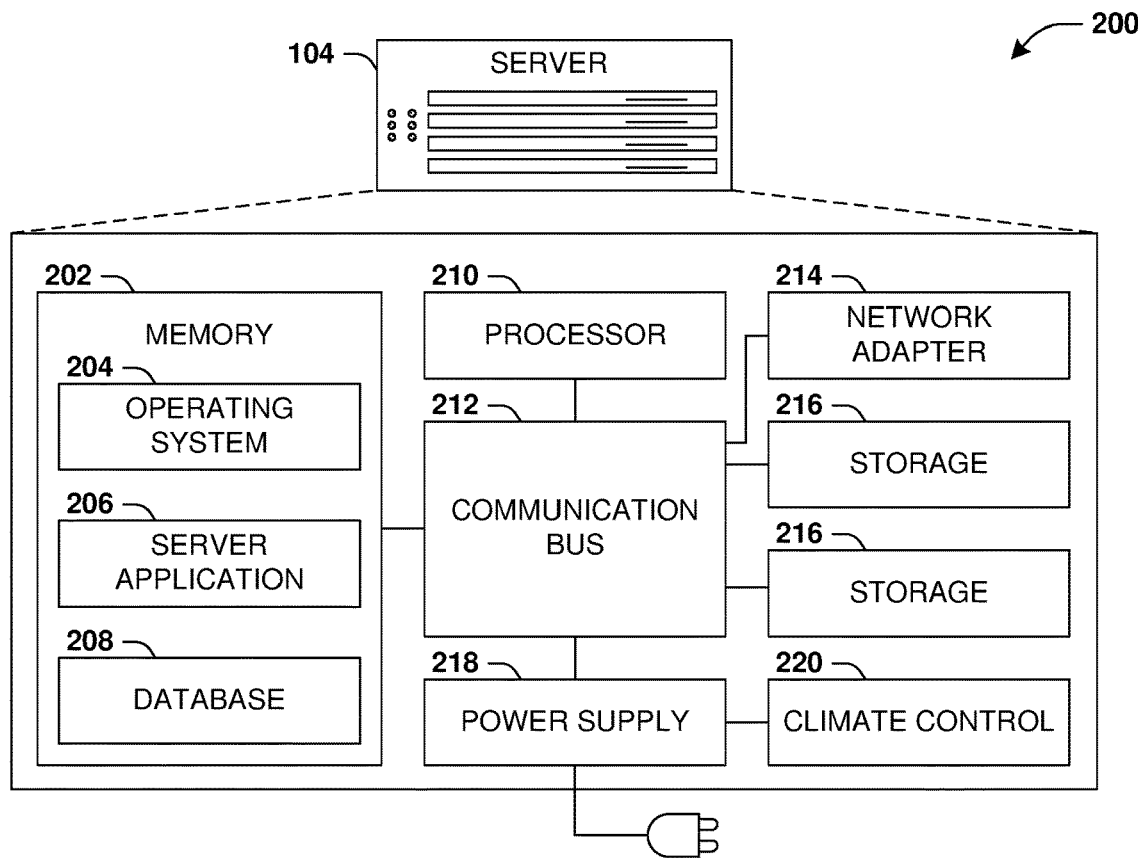
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
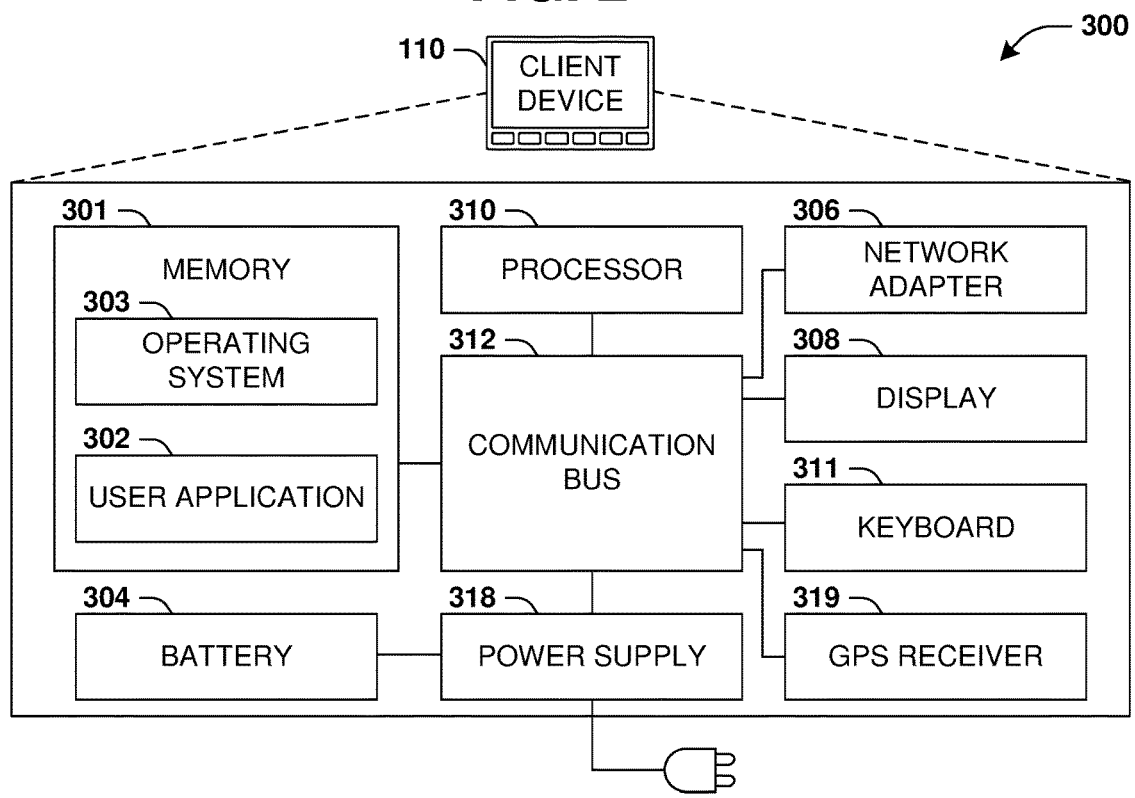
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

Techniques are provided for aggregated cost per action prediction. In particular, multiple decay calculators that can utilize different decay strategies (e.g., decay by time, decay by cost, decay by conversions, decay by clicks, etc.), different half-lives, and/or different decay intervals may be used to generate cost per action predictions. The cost per action predictions are weighted based upon past accuracy and performance of decay calculators that created the cost per action predictions (e.g., a larger weight/contribution may be assigned to a cost per action prediction by a decay calculator that more frequently predicted cost per action predictions that were similar to actual cost per actions over a time period). The weighted cost per action predictions are aggregated to create a final cost per action prediction that may be used to optimize bids. For example, the final cost per action prediction can be used as part of a bidding strategy to bid on opportunities to display content items to users in a manner that optimizes/increases the probability of conversions where a user performs a desired action after viewing and possibly clicking on a content item.

Furthermore, decay calculators are capable of providing an output of no prediction. For example, a decay calculator may output a no prediction output because a number of conversions tracked after decay is performed is below a threshold. Anomaly detection is also provided to compensate for abrupt behavior changes of content items due to changing traffic characteristics such as bid setting changes, changes to targeting settings, and/or other changes that make past conversion and cost data of a particular set of content items invalid. Also, the ability to provide aggregated cost per action prediction for new sets of content items without cold start issues is provided by tracking the average of weights of decay calculators across sets of content items using a dummy content group. The weights tracked within the dummy content group for decay calculators may be assigned to those decay calculators for a new set of content items.

Figure 4:
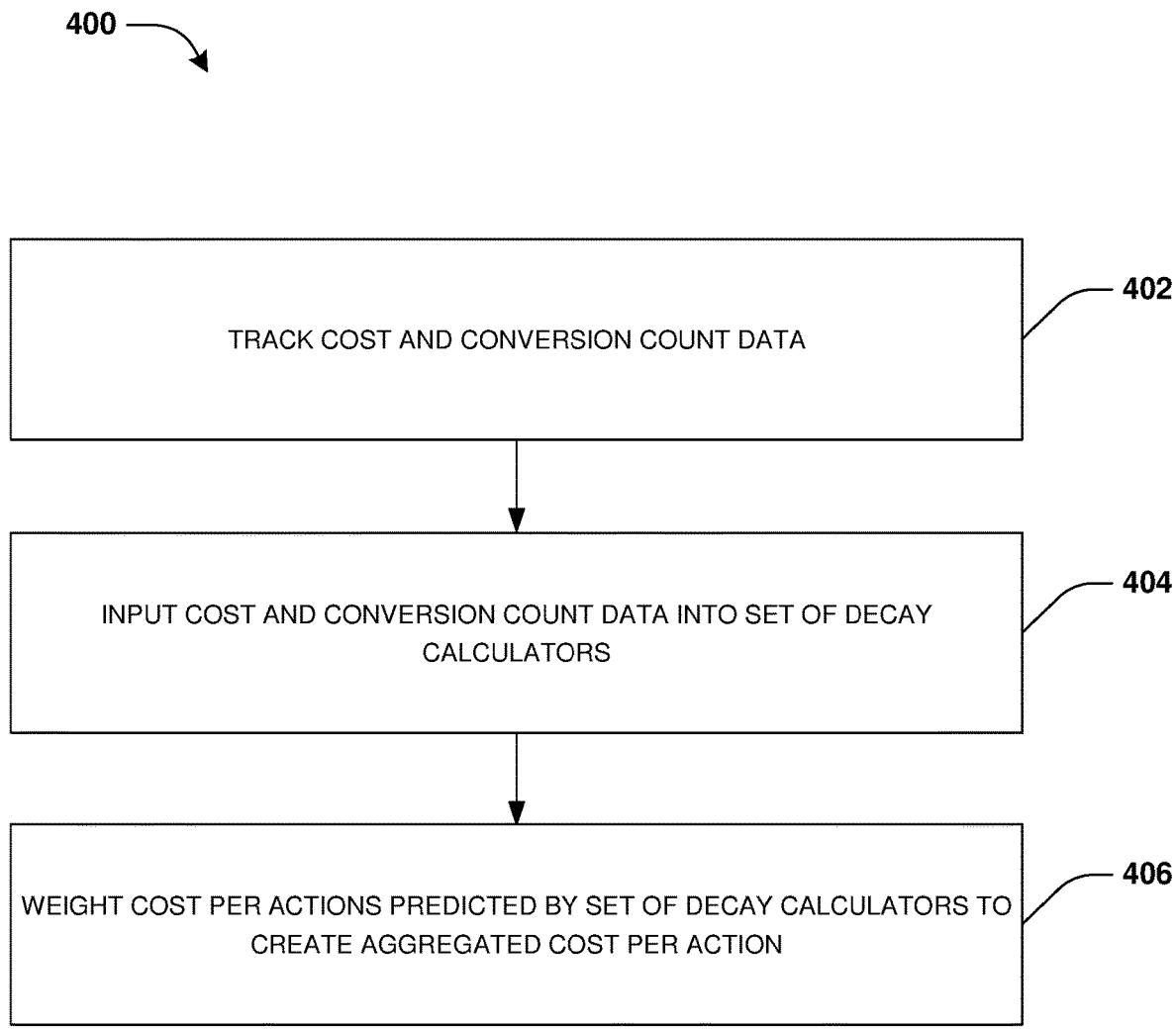
FIG. 4 is a flow chart illustrating an example method for aggregated cost per action prediction.
Figure 5:
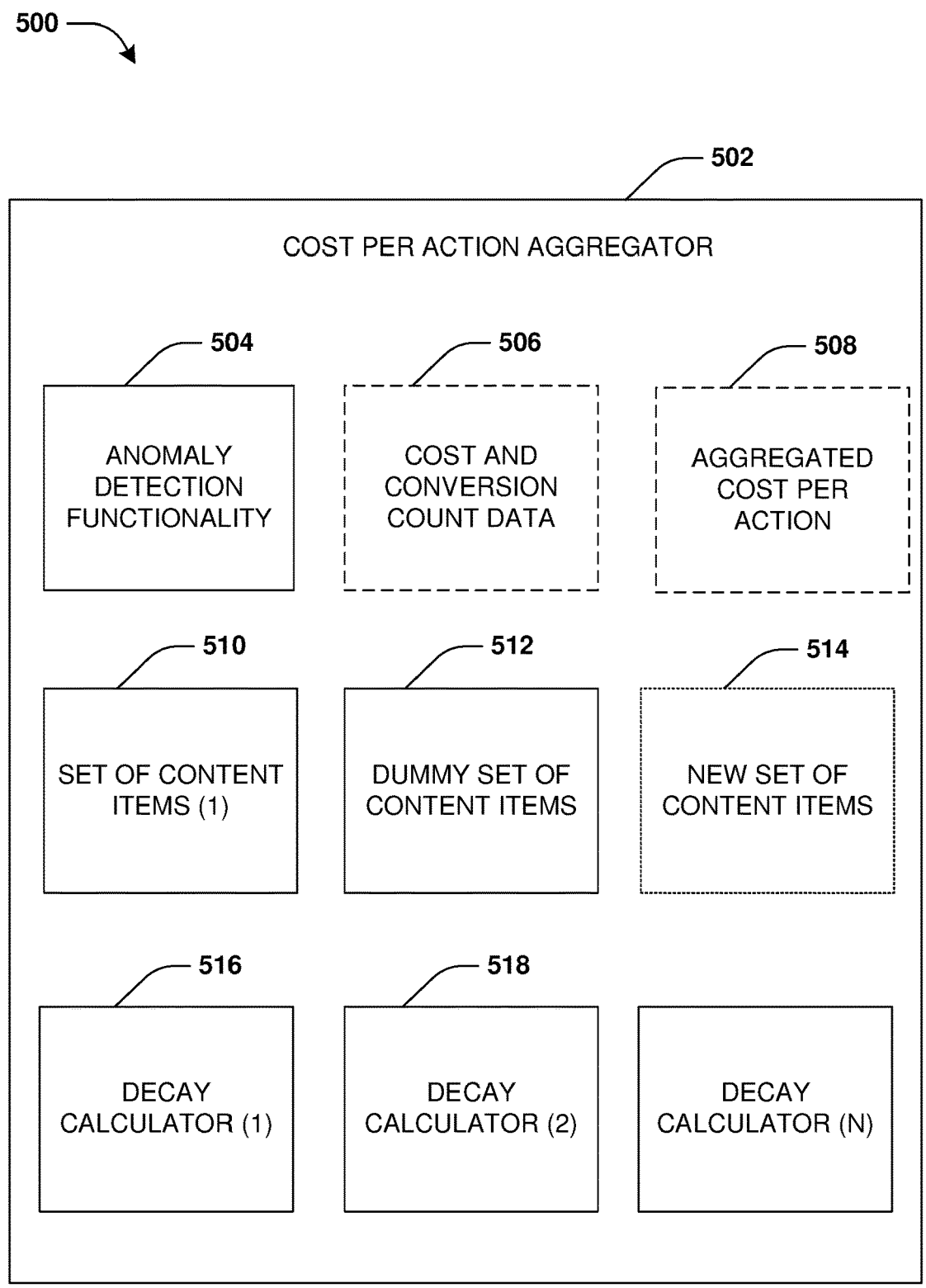
FIG. 5 is a component block diagram illustrating an example system for aggregated cost per action prediction.

An embodiment of aggregated cost per action prediction is illustrated by an example method 400 of FIG. 4, which is described in conjunction with system 500 of FIG. 5. In an example, a cost per action aggregator 502 is configured to aggregate cost per action predictions that are predicted by a set of decay calculators. The cost per action predictions are aggregated to generate an aggregated cost per action prediction 508 that can be used for bidding in a manner that is optimized for conversions. For example, the aggregated cost per action prediction 508 may correspond to a cost to bid on an opportunity to display a content item to a user in order to obtain a conversion such as where the user performs a particular action. In particular, the cost per action aggregator 502 tracks cost and conversion count data 506, at 402. The cost and conversion count data 506 comprises historic data of costs paid by an entity to display content items within a set of content items, such as a first set of content items 510, to users. The cost and conversion count data 506 comprises a count of conversions corresponding to actions performed by the users in response to being provided with content items within the first set of content items 510. The cost and conversion count data 506 may correspond to any number of sets of content items.

At 404, the cost and conversion data 560 is input into a plurality of decay calculators, such as a first decay calculator 516, a second decay calculator 518, and/or other decay calculators. Each of the decay calculators may implement different decay strategies (e.g., decay by time, decay by clicks, decay by conversions, etc.), different decay intervals (e.g., different decay intervals in unit of time, different decay intervals in unit of conversion count, etc.), and/or half-lives (e.g., different half-lives in unit of time, different half-lives in unit of conversion count, etc.).

In an example, the first decay calculator 516 may decay input values by time. For example, the input values are decayed every d minutes (decay interval) by a decay factor corresponding to a half-life value. In another example, the second decay calculator 518 may decay input values by clicks. For example, the input values are decayed for every d clicks of the first set of content items 510 (decay interval) by a decay factor corresponding to a half-life in a unit of clicks. In another example, a third decay calculator may decay input values by conversion count. For example, the input values are decayed for every d conversions, of content items within the first set of content items 510, corresponding to a half-life in a unit of conversions. In another example, a fourth decay calculator decays values by cost corresponding to a cost paid for a click that resulted in a conversion (e.g., a cost paid by an entity to win a bid to display a content item of the first set of content items 510 to that user that then performed an action corresponding to a conversion).

Each of the decay calculators outputs a cost per action prediction based upon the cost and conversion count data 506. For example, the first decay calculator 516 may output a first cost per action prediction based upon the cost and conversion count data 506 using a particular decay strategy, half-life, and/or decay interval. The second decay calculator 518 may output a second cost per action prediction based upon the cost and conversion count data 506 using a particular decay strategy, half-life, and/or decay interval. The third decay calculator may output a no prediction as an output to indicate that the third decay calculator could not create a cost per action prediction based upon the cost and conversion count data 506. Other decay calculators may output other cost per action predictions based upon the cost and conversion count data 506 using various decay strategies, half-lives, and/or decay intervals.

The cost per action aggregator 502 may apply weights to each cost per action prediction based upon past performance of whether corresponding decay calculators correctly or incorrectly predicted cost per actions for content items within the first set of content items 510, at 406. Larger weights may be applied to cost per action predictions by decay calculators that more frequently predicted cost per actions correctly than other decay calculators. Similarly, smaller weights may be applied to cost per action predictions by decay calculators that less frequently predicted cost per actions correctly than other decay calculators. The weights may be dynamically updated based upon accuracy of cost per action predictions by the decay calculators. For example, actual cost per actions may be tracked over a time period, such as a day. The actual cost per actions may be compared to predicted cost per action predictions by decay calculators to see how accurately each decay calculator predicted cost per actions. In this way, a weight may be assigned and/or updated based upon how accurately a decay calculator predicted cost per actions. Weights of the decay calculator may be updated and normalized based upon a function of $$weight_p^{new} = \frac{weight_p^{old}}{\sum_{q \in calculators} weight_q^{old}},$$

where p is a decay calculator, and q is any calculator in the set of decay calculators and "old" refers to the unnormalized weight. The sum of the normalized weights for each group of items equals 1.

The cost per action aggregator 502 aggregates the weighted cost per action predictions by the decay calculators to generate an aggregated cost per action prediction 508. The aggregated cost per action prediction 508 may be used for bid optimization for conversions because the cost and conversion count data 506 was used as input to the decay calculators, and thus the decay calculators are trained based upon cost information and conversion information as opposed to merely click information. If a number of decay calculators with a total weight above a threshold outputted the no prediction as an output, then the cost per action aggregator 502 outputs a no prediction as an aggregated output. Otherwise, if there were decay calculators that outputted no prediction but the sum of their weights are below the threshold then the output is ignored (not taken into account as part of the aggregation). Thus, the cost per action predictions outputted by the other decay calculators are normalized during aggregation to create the aggregated cost per action prediction 508.

The cost per action aggregator 502 may aggregate the weighted cost per actions for the first set of content items 510 based upon a formula $$mCPA = \begin{cases} -1 & \text{if } \sum_{p \in Predictors, mCPA_p = -1} weight_p > 0.5 \\ \dfrac{\sum_{p \in Predictors, mCPA_p > 0} weight_p \cdot mCPA_p}{\sum_{p \in Predictors, mCPA_p > 0} weight_p} & \text{otherwise} \end{cases},$$

where mCPA is the aggregated cost per action prediction 508, weight is a weight of a decay calculator p, mCPA is a cost per action prediction by the decay calculator p of a set of predictors (decay calculators), and −1 is no prediction indicator.

Anomaly detection functionality 504 may be used to discount cost and conversion count data of a set of content items that may be stale, invalid, and/or irrelevant/unhelpful due to various factors such as due to changing traffic characteristics, rapid appearing and churning of content item campaigns, bid setting changes, and/or other changes that made past conversion and cost data of the set of content items invalid.

In an example of the anomaly detection functionality 504, cost per action predictions for the set of content items may be tracked for a particular time period, such as a day. Actual cost per actions for the set of content items are also tracked for the time period. The actual cost per actions may be compared to the predicted cost per actions to determine a difference metric corresponding to a difference between predicted cost per actions and the actual cost per actions. If the difference metric exceeds a threshold (e.g., predicted cost per actions were too different/incorrect compared to actual cost per actions), an enhanced decay factor is applied for decaying the cost and conversion count data of the set of content items. In this way, the cost and conversion count data for the set of content items may be decayed more than usual in order to further discount the cost and conversion count data for the set of content items for which the decay calculators were incorrectly predicting cost per actions compared to actual cost per actions.

In an example of the anomaly detection functionality 504, the cost per action predictions may be determined to be too different than the actual cost per actions (the difference metric exceeding the threshold) based upon a function of $$1 - \frac{\min(mCPA, CPA)}{\max(mCPA, CPA)} \geq minAnomaly,$$

where minAnomaly is a predefined parameter, mCPA is a predicted cost per action, CPA is an actual cost per action, and the left side of the equation is an anomaly score (difference metric) such that the anomaly score will increase for bigger differences between cost per action prediction and actual cost per actions for the set of content items.

The aggregated cost per action prediction 508 may be used for various purposes. In an example, the aggregated cost per action prediction 508 may be used to determine a bid value for an opportunity to display a content item within the first set of content items 510 to a user, such that the bid value is used for bidding in a manner that is tailored for obtaining a conversion (e.g., eliciting an action from a user in response to viewing the content item). In another example, the aggregated cost per action prediction 508 may be utilized for performance monitoring of content items. In another example, the aggregated cost per action prediction 508 may be used for logging purposes. It may be appreciated that there may be other uses than those described.

In an example, weights may be generated and tracked for a dummy set of content items 512. The weights may be generated based upon an average of weights of decay calculators over a plurality of sets of content items. When a new set of content items 514 is available for bidding for display to users, the weights of the dummy set of content items 512 may be assigned to the new set of content items 514 (to the decay calculators for decaying cost and conversion count data of the new set of content items 514) in order to mitigate cold start issues arising from merely using the same weights for every decay calculator with respect to the new set of content items 514.

Figure 6:
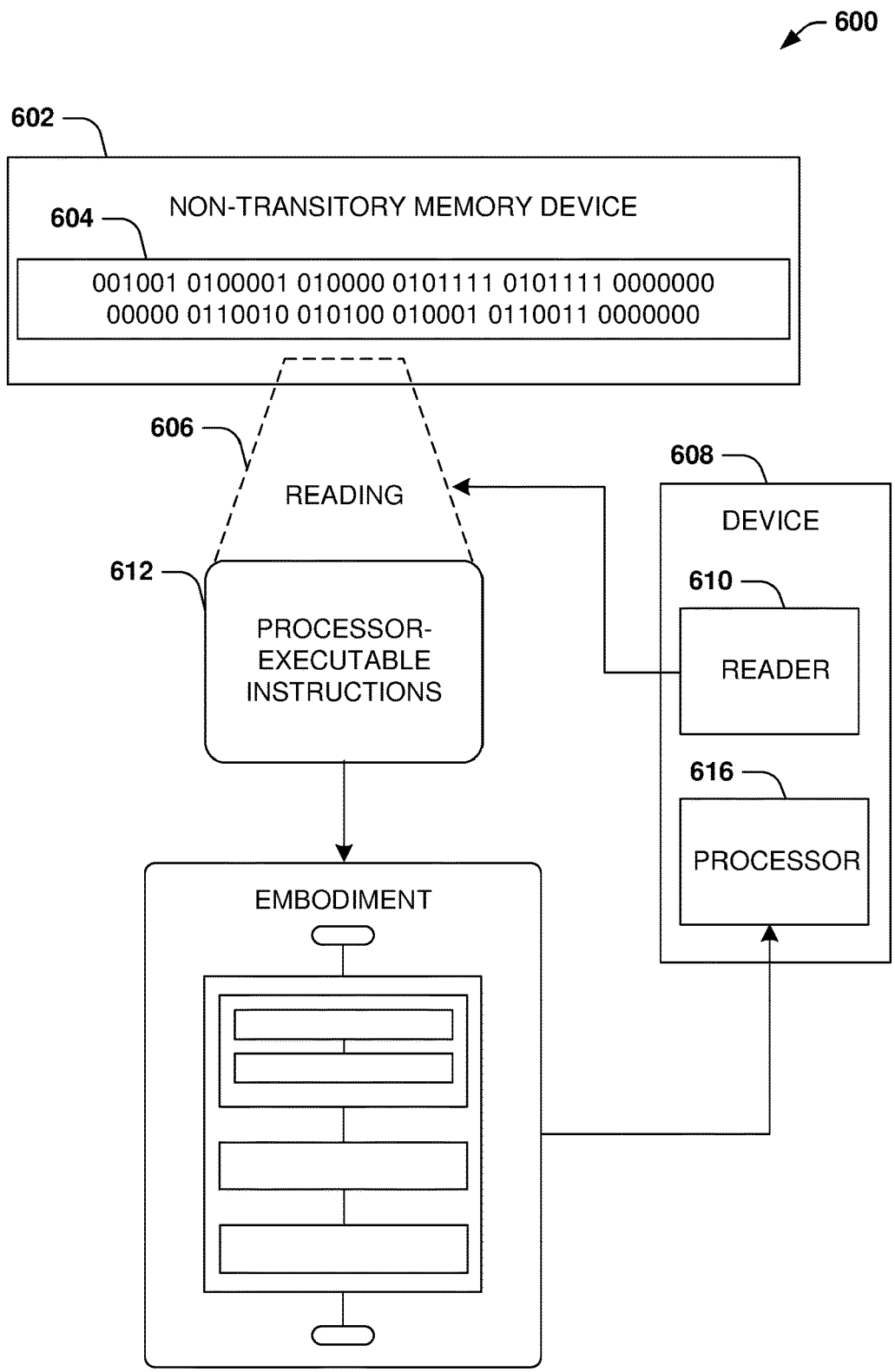
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIG. 5, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
      tracking cost and conversion count data comprising costs for a set of content items to be displayed to users and a count of conversions corresponding to actions performed by users in response to being provided with the set of content items;
      inputting the cost and conversion count data into a set of decay calculators that utilize different decay strategies;
      weighting cost per actions predicted by the set of decay calculators for a content item to create an aggregated cost per action based upon accuracy associated with past performance of whether decay calculators correctly or incorrectly predicted cost per actions for the set of content items, wherein the weighting comprises weighting one or more first cost per actions predicted by a first decay calculator more than one or more second cost per actions predicted by a second decay calculator responsive to determining that the first decay calculator is associated with a higher level of accuracy than the second decay calculator; and
      controlling, based upon the aggregated cost per action created based upon accuracy, bidding on one or more opportunities associated with one or more content items.

2. The method of claim 1, comprising:
   inputting the cost and conversion count data into a decay calculator that decays by time.

3. The method of claim 1, comprising:
   inputting the cost and conversion count data into a decay calculator that decays by cost.

4. The method of claim 1, comprising:
inputting the cost and conversion count data into a decay calculator that decays by conversions.

5. The method of claim 1, comprising:
inputting the cost and conversion count data into a decay calculator that decays by clicks.

6. The method of claim 1, wherein the decay calculators utilize different half-lives.

7. The method of claim 1, comprising:
tracking predicted cost per actions for the set of content items and actual cost per actions over a time period; and
comparing the actual cost per actions to the predicted cost per actions to determine a difference metric corresponding to a difference between the predicted cost per actions and the actual cost per actions.

8. The method of claim 7, comprising:
applying an enhanced decay factor for decaying the cost and conversion count data of the set of content items based upon the difference metric exceeding a threshold.

9. The method of claim 1, wherein the decay calculators utilize different decay intervals.

10. The method of claim 1, wherein a weight for a decay calculator is dynamically updated based upon accuracy of cost per action predictions by the decay calculator for the set of content items.

11. The method of claim 1, wherein a sum of weights for the set of decay calculators is 1.

12. The method of claim 1, comprising:
generating weights for a dummy content group based upon an average of weights of decay calculators over a plurality of sets of content items.

13. The method of claim 12, comprising:
assigning weights of the dummy content group to decay calculators for a new set of content items.

14. A computing device comprising:
a processor; and
memory comprising processor-executable instructions that when executed by the processor cause performance of operations, the operations comprising:
tracking cost and conversion count data comprising costs for a set of content items to be displayed to users and a count of conversions corresponding to actions performed by users in response to being provided with the set of content items;
inputting the cost and conversion count data into a set of decay calculators that utilize different decay strategies;
weighting cost per actions predicted by the set of decay calculators for a content item to create an aggregated cost per action based upon accuracy associated with past performance of whether decay calculators correctly or incorrectly predicted cost per actions for the set of content items, wherein the weighting comprises weighting one or more first cost per actions predicted by a first decay calculator more than one or more second cost per actions predicted by a second decay calculator responsive to determining that the first decay calculator is associated with a higher level of accuracy than the second decay calculator; and
controlling, based upon the aggregated cost per action created based upon accuracy, bidding on one or more opportunities associated with one or more content items.

15. The computing device of claim 14, wherein the operations comprise:
receiving an indication from a decay calculator of no prediction as an output, wherein the aggregated cost per action excludes the output.

16. The computing device of claim 15, wherein the operations comprise:
normalizing outputs from decay calculators that outputted predictions of cost per actions.

17. A non-transitory machine readable medium having stored thereon processor-executable instructions that when executed cause performance of operations, the operations comprising:
tracking cost and conversion count data comprising costs for a set of content items to be displayed to users and a count of conversions corresponding to actions performed by users in response to being provided with the set of content items;
inputting the cost and conversion count data into a set of decay calculators that utilize different decay strategies;
weighting cost per actions predicted by the set of decay calculators for a content item to create an aggregated cost per action based upon accuracy associated with past performance of whether decay calculators correctly or incorrectly predicted cost per actions for the set of content items, wherein the weighting comprises weighting one or more first cost per actions predicted by a first decay calculator more than one or more second cost per actions predicted by a second decay calculator responsive to determining that the first decay calculator is associated with a higher level of accuracy than the second decay calculator; and
controlling, based upon the aggregated cost per action created based upon accuracy, bidding on one or more opportunities associated with one or more content items.

18. The non-transitory machine readable medium of claim 17, wherein the operations comprise:
utilizing the aggregated cost per action to determine a bid value tailored for obtaining a conversion.

19. The non-transitory machine readable medium of claim 17, wherein the operations comprise:
utilizing the aggregated cost per action for performance monitoring of the set of decay calculators.

20. The non-transitory machine readable medium of claim 17, wherein the operations comprise:
logging aggregated cost per actions generated over time.

* * * * *